July 5, 1932. F. W. SPERR, JR 1,866,229
AERATION AND GAS PURIFICATION PROCESS
Filed April 9, 1925 3 Sheets-Sheet 1
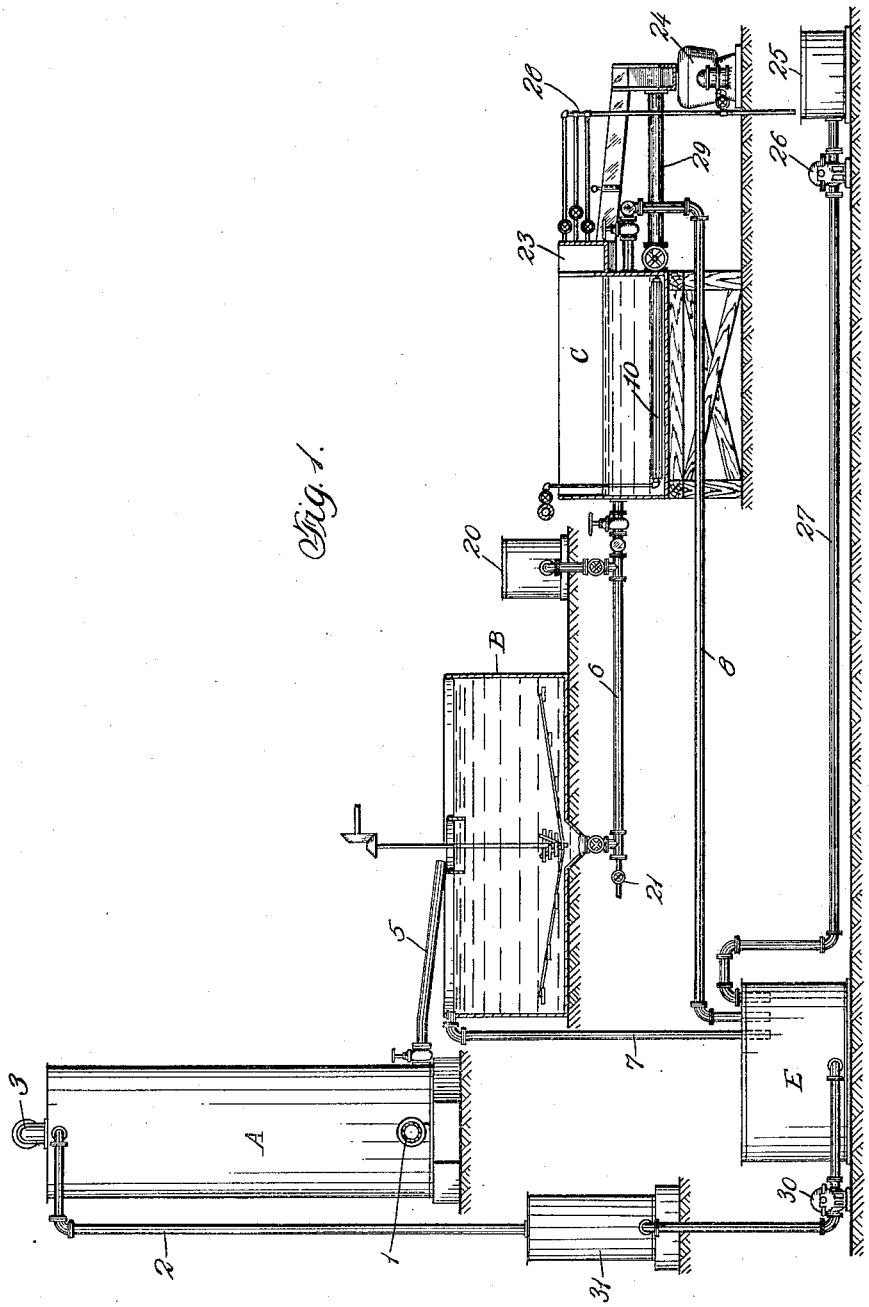
Inventor
Frederick W. Sperr, Jr
By Munday, Clarke & Carpenter
his Attorneys

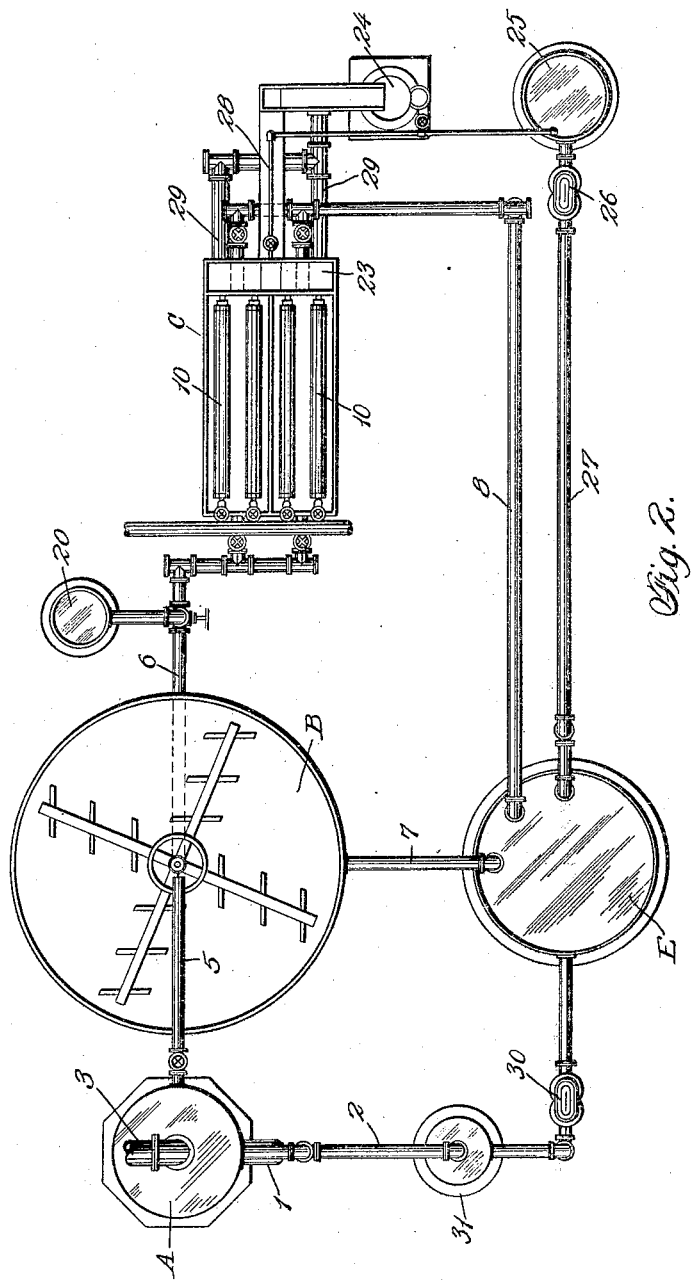

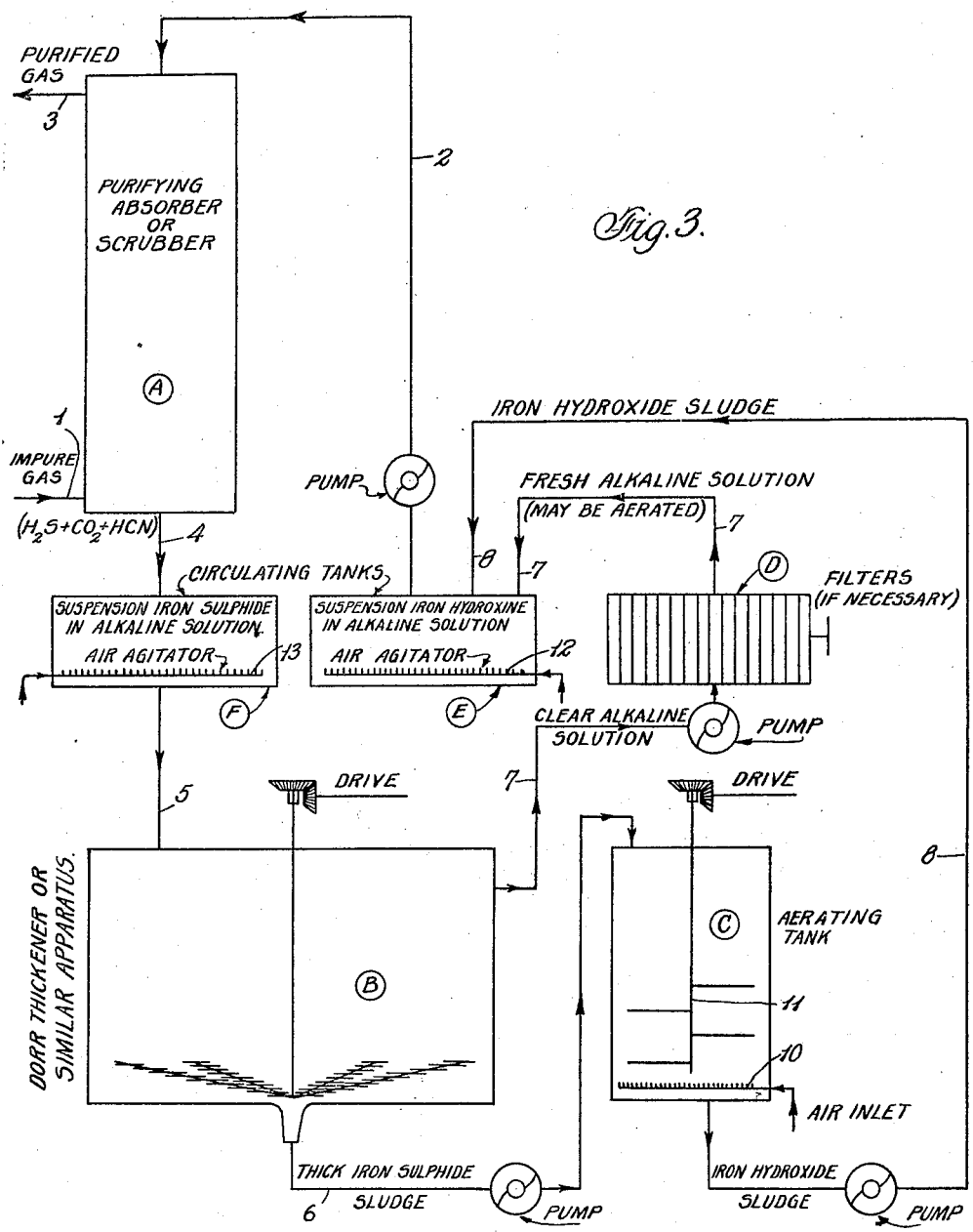

Patented July 5, 1932

1,866,229

UNITED STATES PATENT OFFICE

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA

AERATION AND GAS PURIFICATION PROCESS

Application filed April 9, 1925. Serial No. 21,979.

This invention relates to the elimination of hydrogen sulphide and other acidic gaseous constituents from gases containing them, for example, coal gas, water gas, and other fuel gases.

Objects of the invention are to effect an efficient purification of such gases by means of an absorbent agent which removes the acidic gaseous constituents, and to achieve an efficient revivification of the absorbent agent in a manner that effects the ultimate formation of free sulphur, which may be removed from the absorbent agent by suitable separation methods, thereby avoiding the escape of the noxious hydrogen sulphide fumes into the atmosphere in the vicinity of the gas purifying plant.

The invention consists in a process for the above purpose comprising washing the gas with a suspension of an iron compound in an alkaline solution, separating a sludge containing iron sulphide from the spent wash liquid, and aerating the sludge by forcing finely atomized air thereinto.

The invention further consists in such other new and useful improvements, and has for further objects such other operative advantages or results, as may be found to obtain in the processes and apparatus hereinafter described or claimed.

In the accompanying drawings forming a part of this specification and showing for purposes of exemplification a certain form and manner in which the invention may be embodied and practiced, but without limiting the claimed invention to such illustrative instances:

Figure 1 is an elevation partly in section of an installation of apparatus for carrying out the processes; and Figure 2 is a plan view of the apparatus shown in Figure 1.

Figure 3 is a flow sheet illustrating diagrammatically the process.

In its present embodiment, the invention is applied to the purification of fuel gases, such as coke oven gas from which the tar and ammonia have been removed; for convenience, the present description will be confined to the above mentioned important application of the invention. The invention is, however, readily susceptible of other valuable application; consequently, the invention is not confined in its scope to the specific use and embodiment herein described as an illustrative example.

In carrying out the invention as shown in the drawings, the gases containing the impurities are passed through a gas line 1 into the bottom of a scrubber or washer A, which is supplied with the purifying agent or liquid through a pipe line 2 that enters the top of the scrubber.

In the scrubber A, the gases are brought into contact with the absorbent liquid which is constituted of dissolved alkali, such as sodium carbonate, or other alkaline substances, and containing in suspension an iron compound, such as iron oxide, having an affinity for sulphur. The purified gases pass out of the top of the scrubber A through a gas line 3. From the bottom of the scrubber A, the liquid containing the impurities discharges through a line 5 to a continuous separator B, such as a Dorr thickener. By the action of the separator B the bulk of the iron sulphide is agglomerated as a heavy sluge and may be drawn off from the bottom of the separator separately from the alkaline solution. The iron sulphide sludge is pumped through a sludge line 6 into a vessel C in which the iron sulphide is subjected to aeration. A tank 20 containing a supply of a neutralizing agent is connected to the sludge supply line 6 as shown. The flow of sludge through the pipe 6 may be facilitated by compressed air from a pipe 21 and water may also be introduced through the pipe 21 to wash out the sludge piping. Maintaining the sludge neutral or slightly acid during aeration increases the efficiency of oxidation and facilitates the separation of sulphur.

The aerator C is preferably a "thionizer" as described in the assignee's application, Ser. No. 21,978, filed of even date herewith, now Patent No. 1,755,614. In order to facilitate the separation of sulphur very small quantities of kerosene, coal tar, a coal tar distillate, or other flotation agent is added to the sludge in the thionizer. The sulphur separates in the form of a foam which overflows into a trough 23 and passes to a centrifuge 24. A filter may be used instead of the centrifuge. The liquid from the centrifuge or filter flows into a tank 25 and is pumped into the tank E by pump 26 through pipe 27. The iron oxide sludge from the aerating treatment is transferred by a line 8 and the fresh alkaline solution by the line 7 to the circulating tank or sump E, where oxide and solution are again mixed to form the suspension. The solution containing the suspension of iron oxide is thus regenerated and is now ready to treat further quantities of impure gas.

From time to time fresh iron oxide may be added, or else iron sulphide may be added at a point before the oxidation which will convert it to iron oxide.

The tank E contains the suspension which contains an amount of ferric oxide, usually from 0.2% to 1.5% $Fe_2O_3$, and sodium carbonate to the amount usually about 3% $Na_2CO_3$. Additions of alkali required to maintain the alkalinity of the liquid are preferably made to the tank E, either intermittently or continuously.

The reconstituted suspension in the tank E is pumped by pump 30 through a heater 31 which maintains it at approximately 85° F., as it enters the absorber A. This absorber is preferably of the type described in the assignee's application, Ser. No. 21,980 filed of even date herewith, Patent No. 1,715,253.

Instead of conducting the oxidation continuously the sludge may be accumulated in thionizer C, and aerated periodically.

Instead of having the sulphur foam overflow continuously into trough 23, it has been found advantageous to use a moderate aeration in the thionizer in such a way that the sulphur accumulates without overflowing. By periodically increasing the air rate, the sulphur is caused to overflow into the trough, and weirs between the trough and the tank may then be closed, the sulphur allowed to settle, and the supernatant liquid drawn off through a manifold 28, before running the sulphur into the centrifuge.

There is also provided a pipe 29 so connected that all of the sludge may be centrifuged if desired.

The process and apparatus hereinbefore described, are useful in connection with the several gas purification processes described in the assignee's applications, Ser. No. 730,676, filed Aug. 7, 1924, and Ser. No. 21,982 and Ser. No. 21,983, filed of even date herewith.

In this process there is discharged from the gas treating stage or stages a liquid with solid matter in suspension which consists chiefly of ferric sulphide ($Fe_2S_3$) mixed with ferric oxide ($Fe_2O_3$) and/or other relatively insoluble iron compounds, and the proportion of suspended solids to liquid is very low, 0.2% to possibly 3.0%, although seldom over 1.0%. This is necessary for several reasons— for example to minimize secondary reactions and mechanical losses and to obtain satisfactory distribution and contact in the absorber or absorbers and to avoid the stoppages that result from the circulation of heavy suspensions.

On the other hand the employment of dilute suspensions entails the use of relatively large aeration apparatus and of relatively large amounts of air. It is found that the amount of air required for effective regeneration is to a large extent proportional to the volume of liquid, rather than to the amount of ferric sulphide present in suspension. For example, it is possible to obtain effective regeneration of a given volume of solution containing 5% $Fe_2S_3$ with practically the same amount of air as is required for the same volume containing 0.5% $Fe_2S_3$. The present invention therefore may be regarded as an improvement of all the processes described in the specifications mentioned, and also particularly of the assignee's copending prior application Ser. No. 520,807, filed Dec. 8, 1921, by providing means for concentrating the ferric sulphide as much as possible before aeration in the form of a thickened sludge, and thereby economizing in power, labor and apparatus.

In the gas purification step the chemical reactions may be exemplified by the following equations:

(a) Absorption of hydrogen sulphide by sodium carbonate:

$$Na_2CO_3 + H_2S = NaHS + NaHCO_3$$

Carbon dioxide, if present, is also absorbed:

$$Na_2CO_3 + H_2O + CO_2 = 2NaHCO_3$$

(b) Action of sodium hydrogen sulphide and sodium bicarbonate on the iron oxide forming iron sulphide:

$$Fe_2O_3 + 3NaHS + 3NaHCO_3 = Fe_2S_3 + 3NaCO_3 + 3H_2O$$

(c) Direct absorption of hydrogen sulphide by iron oxide:

$$Fe_2O_3 + 3H_2S = Fe_2S_3 + 3H_2O$$

During the aeration of the iron sulphide sludge, the chemical reaction may be exemplified by the following:

$$2Fe_2S_3 + 3O_2 = 2Fe_2O_3 + 6S$$

Aeration of the solution will also convert some sodium bicarbonate to sodium carbonate as follows:

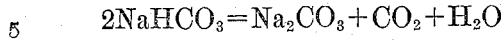

In addition to these reactions, some of the soluble sulphide, such as sodium hydrogen sulphide, reacts with the free sulphur present and air, resulting in the formation of sodium thiosulphate. When the iron sulphide sludge and solution is aerated separately, the rate of thiosulphate formation is much slower than when the sludge and solution are aerated simultaneously. The sodium thiosulphate may be allowed to accumulate in the liquid and can then be recovered by a suitable process, such as that described in the assignee's prior applications Ser. No. 458,578, filed April 4, 1921, and Ser. No. 462,309, filed April 18, 1921. The rate of thiosulphate formation may be decreased by employing very dilute solutions, such as a solution containing one-half percent sodium carbonate or less. A further advantage in using such weakly alkaline solution is that the loss of alkali is thereby decreased and the process made more economical.

The suspension will also remove most of the hydrocyanic acid from the gas.

The purification process is carried out as mentioned in the above exemplifications by means of a suspension of iron oxide in an alkaline solution. This washing mixture may be obtained by means of a number of materials which have essentially the same effect in carrying out the reactions described. Instead of iron oxide, ferric carbonate or basic ferric carbonate may be employed; or the iron may be either in the form of ferric hydroxide or ferric oxide. Ferrous compounds, may also be used instead of the iron oxide either in the form of ferrous oxide, ferrous carbonate or basic carbonate or ferrous hydroxide. When ferrous compounds are employed they should be introduced into the liquid near its inlet to the oxidizing device or thionizer so that they will become largely converted into the ferric state before coming into contact with the hydrogen sulphide of the gas. The dissolved alkali may be any substance which gives an alkaline reaction to the solution, such as the carbonates of sodium and potassium, or the hydroxides of sodium and potassium; or else alkaline magnesium or calcium compounds, such as magnesium hydroxide and magnesium carbonate, may be added to the suspension, which has the same effect of rendering the solution alkaline.

The invention as hereinabove set forth or exemplified may be variously practiced or embodied within the scope of the claims hereinafter made.

I claim:

1. A process for removing hydrogen sulphide and other acidic gaseous constituents from fuel gas which comprises: subjecting the fuel gas to the action of an alkaline liquid containing in suspension a solid reactive to the hydrogen sulphide to absorb hydrogen sulphide from the gas; separating a substantial proportion of the sulphided solid from the liquid in the form of a concentrated sludge; subjecting the sludge while so separated to the action of finely atomized air to liberate sulphur as free sulphur and so as to effect thereby separation of the so liberated free sulphur from the sludge by flotation; mixing the oxidized sulphur-freed sludge with separated liquid; and re-employing the mixture in the fuel gas treatment stage.

2. A process for removing hydrogen sulphide and other acidic gaseous constituents from fuel gas which comprises: subjecting the fuel gas to the action of an alkaline liquid containing in suspension an iron compound reactive to the hydrogen sulphide to absorb hydrogen sulphide from the gas; separating a substantial proportion of the sulphided solid from the liquid in the form of a concentrated sludge and neutralizing it; subjecting the sludge while so separated to aeration to oxidize the sulphided solid with liberation of the sulphur as free sulphur; effecting such aeration of the sludge while in the presence of kerosene to facilitate flotation of the sulphur from the sludge; periodically increasing the rate of flow of air to flow accumulated floated sulphur off of the sludge intermittently; mixing the residual sludge with separated liquid; and re-employing the mixture in the fuel gas treatment stage.

3. A process for removing hydrogen sulphide and other acidic gaseous constituents from fuel gas which comprises: subjecting the fuel gas to the action of an alkaline liquid containing in suspension an iron compound reactive to the hydrogen sulphide to absorb hydrogen sulphide from the gas; separating a substantial proportion of the sulphided solid from the liquid in the form of a concentrated sludge and neutralizing it; subjecting the sludge while so separated to aeration to oxidize the sulphided solid with liberation of the sulphur as free sulphur; effecting such aeration of the sludge while in the presence of a flotation agent to facilitate flotation of the sulphur from the sludge; periodically increasing the rate of flow of air to flow accumulated floated sulphur off of the sludge intermittently; mixing the residual sludge with separated liquid; and re-employing the mixture in the fuel gas treatment stage.

4. A process for removing hydrogen sulphide and other acidic gaseous constituents from fuel gas which comprises subjecting the fuel gas to the action of an alkaline liquid containing in suspension a solid reactive to the hydrogen sulphide to absorb hydrogen sulphide from the gas; separating a substantial proportion of the sulphide solid from the liquid in the form of a concentrated sludge; subjecting the sludge while so separated to aeration to liberate sulphur as free sulphur and so as to effect thereby separation of the so liberated free sulphur from the sludge by flotation periodically increasing the rate of flow of air to overflow accumulated floated sulphur off of the sludge intermittently; mixing the oxidized sulphur-freed sludge with separated liquid; and re-employing the mixture in the fuel gas treatment stage.

In testimony whereof I have hereunto set my hand.

FREDERICK W. SPERR, Jr.